Sept. 20, 1960   F. W. AINSWORTH   2,953,162
COMPENSATED HYDRAULIC VALVE
Filed Dec. 31, 1954   2 Sheets-Sheet 1

INVENTOR.
FRANK W. AINSWORTH
BY
ATTORNEY

Sept. 20, 1960 F. W. AINSWORTH 2,953,162
COMPENSATED HYDRAULIC VALVE
Filed Dec. 31, 1954 2 Sheets-Sheet 2

INVENTOR.
FRANK W. AINSWORTH
BY
*Alan M. Staubly*
ATTORNEY

United States Patent Office 2,953,162
Patented Sept. 20, 1960

2,953,162
COMPENSATED HYDRAULIC VALVE

Frank W. Ainsworth, Minneapolis, Minn., assignor to Minneapolis-Honeywell Regulator Company, Minneapolis, Minn., a corporation of Delaware Filed Dec. 31, 1954, Ser. No. 478,955

12 Claims. (Cl. 137—622)

The use of valves in the control of pressure fluid has of course long been practiced; and the force required to operate them under low pressure conditions has been, generally speaking, that needed to overcome the friction forces inherent in the valve design. However, as the pressures at which these valves were operated increased from a couple hundred p.s.i. (pounds per square inch) to 2000, 3000, and higher p.s.i., a phenomenon, known as Bernoulli flow forces, made their presence felt during the porting of fluid through the valves. Bernoulli flow forces in valve design are those forces that occur upon the porting of a valve and a consequent flow of fluid past the ported orifice and generally tend to return the valve to a closed position because of the tendency of the pressure head of flowing fluid to vary inversely with its velocity head. With the increase in operating pressures, the Bernoulli flow forces have increased, requiring large valve actuators, or in the alternative, Bernoulli flow force compensation.

The present invention provides Bernoulli flow force compensation by directing a fluid stream against a valving member to assist in the maintaining of the open valve condition when such is desired, such fluid stream setting up forces to compensate for the Bernoulli flow forces, thereby allowing valve actuation forces to be approximately that just necessary to overcome friction inherent in the valve.

It is therefore an object of the invention to provide valve control that will allow the valve to be actuated by such forces as are necessary to overcome inherent valve friction.

Another object of the invention is to provide a device that will compensate for Bernoulli flow forces that arise in porting in high pressure valves.

A further object is to provide a flow force compensating device that is simple in its operation and design.

Further objects of the invention will become apparent upon reading the following description in which.

Figure 6:
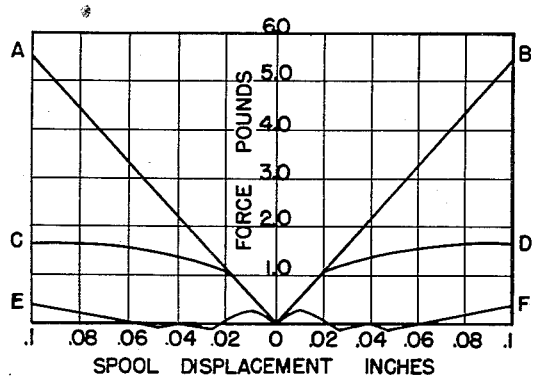
Figure 5:
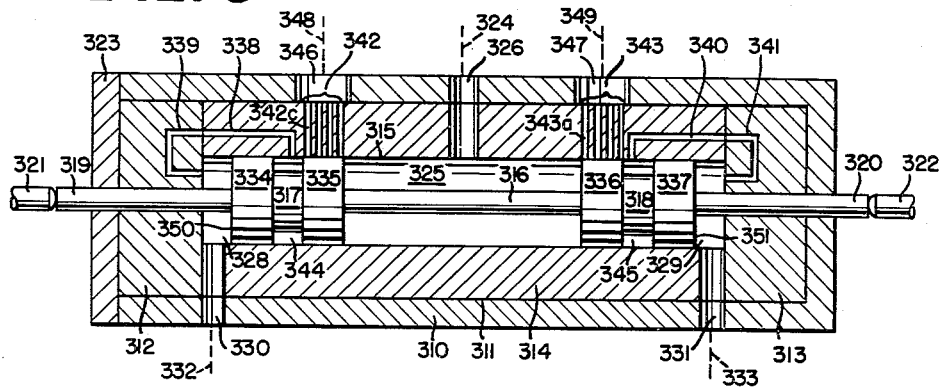

Figure 5 discloses a further modification of the invention;

Figure 6 is a graph indicating "Displacement" vs. "Force" for valves utilizing various porting configurations.

Figure 1:
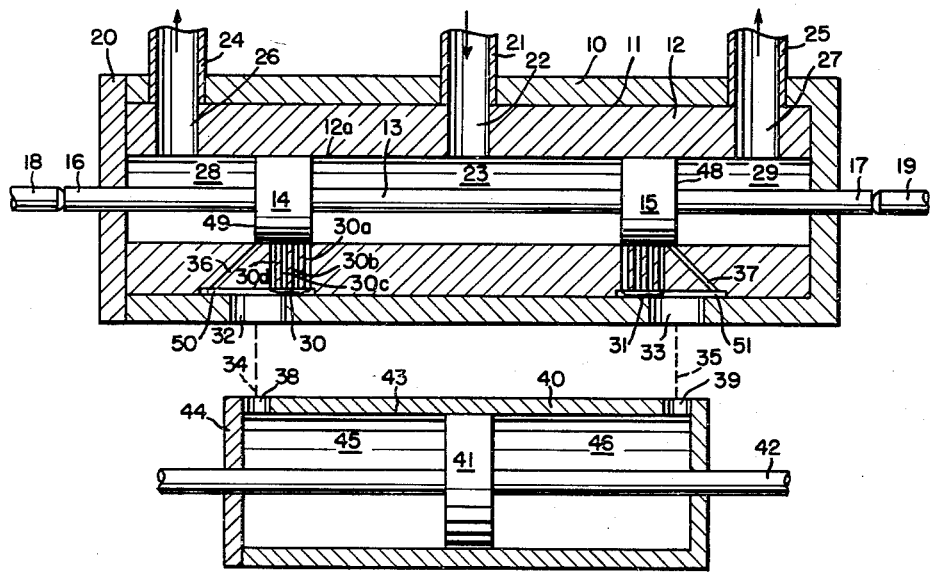
Figure 1 is a vertical cross-sectional view of a valve incorporating the invention.

In Figure 1, a valve body 10, with an end plate 20 fluidly sealed thereto, has a bore 11 in which a valve sleeve 12 is disposed. A valve spool 13 is disposed within a bore 12a of the valve sleeve 12 and has two valve lands 14 and 15. Valve stems 16 and 17 engage armatures 18 and 19 respectively of torque motors, not shown, which provide the necessary movement, when energized, to operate the valve. An inlet pipe 21 is fluidly sealed to the valve body 10 and communicates with an inlet passage 22 and an inlet chamber 23 in the sleeve 12. On either side of the inlet are exhaust pipes 24 and 25, which are fluidly sealed to valve body 10 and which communicate with exhaust passages 26 and 27 and exhaust chambers 28 and 29 in sleeve 12. Ports 30 and 31, leading to passages 50 and 51 and 32 and 33 and to fluid connectors 34 and 35, are comprised of a series of relatively small diameter, closely centered holes located radially from and perpendicular to the axis of the valve spool 13. Angular passages 36 and 37 located outwardly of the ports 30 and 31 are formed in the valve sleeve 12 at an acute angle with the axis of the valve spool 13 and diverge respectively toward the nearest end portion of the valve sleeve 12. When the valve spool 13 is in a neutral or closed position, as shown in Figure 1, the valve lands 14 and 15 completely cover the ports 30 and 31 and the angular passages 36 and 37. Fluid flow connectors 34 and 35 lead to passages 38 and 39 in actuator body 40. The actuator body 40 has a piston 41 with a piston rod 42 disposed within a bore 43 thereof which results in the formation of chambers 45 and 46. The actuator body 40 is closed at its open end by end plate 44.

Assuming the valve is in the position shown and that a movement to the right of the actuator is desired, the operation of the device is as follows: The armature 19 under the direction of a torque motor, not shown, moves to the left engaging valve stem 17 and moving the valve spool 13 to the left, thereby allowing inlet pressure fluid to enter port 30a from inlet chamber 23 and passage 22, and thence pass through passage 50, passage 32, fluid connector 34, passage 38 and into chamber 45 of the actuator body 40, moving piston 41 to the right and forcing fluid from chamber 46 into passage 39, fluid connector 35, passage 33, passage 51 and angular passage 37 which has been uncovered by movement of valve spool 13. Further movement to the right of valve spool 13 uncovers 30b, 30c and 30d. The fluid leaving angular passage 37 enters exhaust chamber 29 in the form of a jet stream and impinges on the face 48 of valve spool land 15 setting up forces thereon, and thence passes to the exhaust passage 27, exhaust pipe 25, and to a sump, not shown. If the angular hole 37 were not provided, the flow force set up by the movement of the valve spool 13 to the left and the consequent flow of fluid past the valve land 14 would tend to move the valve spool 13 to the right and return the valve spool 13 to a closed position. The provision of the angular passage 37 however causes a balancing force to be placed on the valve land 15 opposing the flow forces set up by porting or "cracking" the valve. If the valve spool 13 were moved to the right instead, the angular passage 36 would direct a stream of exhaust fluid to impinge on the face 49 of valve land 14 setting up the compensation forces necessary to balance out the Bernoulli flow forces.

The angle at which the angular passages 36 and 37 are placed is dependent on the pressure of the system, the diameter of the holes making up the ports 30 and 31, and the diameter of the holes making up the angular passages 36 and 37. This is because the magnitude of the Bernoulli flow forces are dependent on the velocity of the fluid being ported past the valve land, which in turn is dependent on the pressure of the system and the port size. Likewise, the balancing force is dependent on the dynamic force placed on the face of the valve land by the fluid jet stream, which is a function of the diameter of the angular hole. Further, if the compensation effect of one angled hole is not sufficient, a series of angled holes could be provided.

Figure 2:
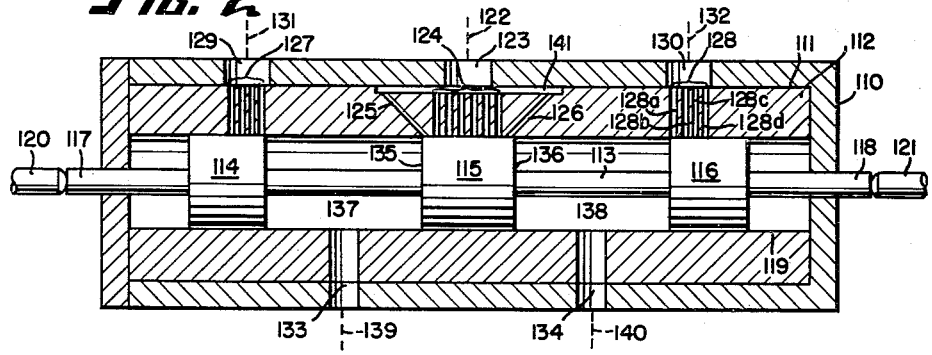
Figure 2 is a similar view of a modification of the invention.

An alternate method for obtaining flow force compensation is shown in Figure 2, wherein a valve body 110 has a bore 111 with a valve sleeve 112 disposed therein. A valve spool 113 with valve lands 114, 115 and 116 and valve stems 117 and 118 is located within a bore 119 of valve sleeve 12. Armatures 120 and 121 of torque motors, not shown, provide motive force when energized for the operation of valve spool 113 by engaging the valve stems 117 and 118 respectively. Inlet fluid connector 122 leads to passages 123 and 124, which in turn communicates with a series of relatively small, closely centered inlet ports 124 and angular ports 125 and 126 which are placed on either side of the series of inlet ports 124 at an acute angle with the axis of the valve spool 113 and which diverge respectively toward the nearest end of the valve sleeve 112. Exhaust ports 127 and 128 comprised of a series of relatively small, closely centered holes, communicate with exhaust passages 129 and 130 and exhaust fluid connectors 131 and 132. Passages 133 and 134 lead from chambers 137 and 138 to fluid flow connectors 139 and 140 which lead to a controlled member, not shown. The valve lands 114, 115 and 116 of valve spool 113, when in a neutral position or closed position, completely cover the series of inlet ports 124, the angular ports 125 and 126 and the series of exhaust ports 127 and 128.

Assuming the valve is in the position shown and that the valve spool 113 is to be moved to the right, the operation of the device of Figure 2 is as follows: as the valve spool 113 is moved to the right and "cracked," fluid passes the lower orifice of angular port 125 and strikes the left face 135 of valve land 115, placing a force thereon that opposes the Bernoulli flow forces that are also set up, due to the fluid passing a ported orifice, and thus assists in maintaining the valve in an open position and counteract the tendency, due to Bernoulli flow forces, of the valve to reclose. Pressure fluid is delivered to the controlled member, not shown, by means of chamber 137, passage 133, and fluid connector 139. The exhaust fluid flows through fluid connectors 140, passage 134, chamber 138, and exhaust ports 128a, 128b, 128c, 128d as they are opened. Exhaust port 127 remains closed during this movement. Of course, moving the valve spool to the left places the balancing force on the right face 136 of valve land 115 and causes the exhaust fluid to escape through exhaust port 127.

Figure 3:
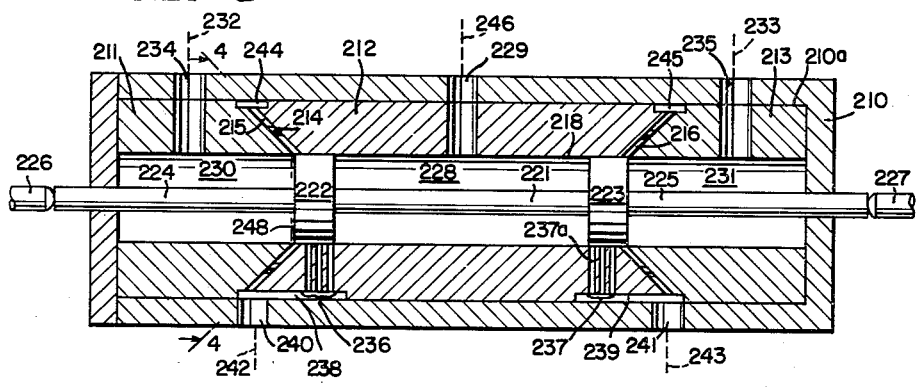
Figure 3 is the same view of another modification of the invention wherein a conical passage is utilized.

Another method of delivering the fluid stream to balance out the flow forces is shown in Figure 3. In some applications, the use of angular drilled holes for compensation is not feasible, due to the small diameter holes that may be required by the particular design and the fabrication problems that are caused thereby. In such a situation, an annular port may be utilized. Figure 3 shows an annular port in the form of a conical passage used as an angularly directed passage. More specifically: a valve body 210 has within its bore 210a valve sleeve portions comprised of three portions 211, 212, and 213, separated from each other by nibs 214 located on valve sleeve portion 212. The nibs 214 allow conical passages 215 and 216 to be formed between the valve sleeve portions 211 and 212, and 212 and 213. Within the bore 218 of the valve sleeve portions 212, 213, and 214 is located a valve spool 221 that has valve lands 222 and 223 and valve stems 224 and 225 that are engaged by armatures 226 and 227 respectively of torque motors, not shown. An inlet chamber 228 is connected to inlet fluid connector 246 by means of passage 229. Exhaust chambers 230 and 231 are connected to the fluid connectors 232 and 233 by the passages 234 and 235. Ports 236 and 237 lead to a controlled member, not shown, through passages 238 and 239, ports 240 and 241, and fluid connectors 242 and 243. An annular groove 244 is formed partially in valve sleeve portion 212 and partially in valve sleeve portion 211. Similarly annular groove 245 is formed partially in valve sleeve portion 212 and partially in valve sleeve portion 213. When the valve spool 221 is in a closed or neutral position, the valve lands 222 and 223 completely cover the ports 236 and 237 and the conical passages 215 and 216. If it were required, the ports 236 and 237 could be of a fully annular design by utilization of the nib construction described above.

Figure 4:
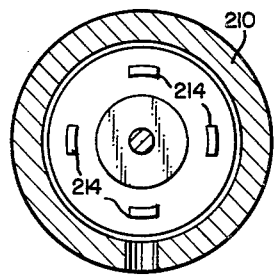
Figure 4 is a cross-sectional view of the invention taken along the line 4—4 of Figure 3.

Figure 4 is a cross section of the modification of Figure 3 along line 4—4 showing the location of the nibs 214, which design allows fluid to flow through conical passages 216 and 217.

Thus, if the valve spool 221 is moved to the right, port 237a is uncovered and the inlet pressure fluid passing from chamber 228 to the controlled member, not shown, would force exhaust fluid to pass through the fluid connector 242 from the controlled member, not shown, into passage 238, annular groove 244, and conical passage 215. As the fluid leaves the conical passage 216 it strikes the left face 248 of valve land 222, placing a dynamic force thereon assisting to maintain the valve spool 221 in an open position by balancing out or counteracting the Bernoulli flow forces set up by "cracking" the valve land 223 past the orifice 237a, as has been described previously. The conical passages 215 and 216 can be enlarged, reduced, or placed at various angles, to reduce or increase the compensation forces, as is required by the specific valve design.

The fluid stream used for compensation can be directed at the valve member normal to its end face rather than at an angle. Such an arrangement is shown in Figure 5. Therein, valve body 310 has a bore 311 in which end members 312 and 313 are placed on either end of valve sleeve 314. The sleeve 314 has a bore 315, and the valve member 316 disposed therein has valve spools 317 and 318 and valve stems 319 and 320 which engage armatures 321 and 322 respectively, of torque motors, not shown. End plate 323 is fluidly sealed to valve body 310. Inlet fluid flow connector 324 supplies pressure fluid to chamber 325 through passage 326. Exhaust fluid leaves chambers 328 and 329 through passages 330 and 331 and exhaust fluid flow conndectors 332 and 333. Valve spools 317 and 318 are undercut to provide two lands on each spool portion, 334 and 335 and 336 and 337. When the valve member 316 is in a closed or neutral position passages 338 and 339, and 340 and 341, located in valve sleeve 314 and end members 312 and 313 do not communicate with the series of ports 342 and 343. The undercuts 344 and 345 provide a channel for communication between the passages 338 and 339 and 340 and 341 and the ports 342 and 343 when the valve is in such a position that the ports 342 and 343 are registering with undercuts 344 and 345. The ports 342 and 343, passages 346 and 347, and fluid connectors 348 and 349 lead to a controlled member, not shown.

In operation, this device is similar to those previously described. When the valve member 316 is moved to the right by the armature 321 of the torque motor, not shown, fluid under pressure flows from chamber 325 past the valve spool portion 336 and enters the port 343a. This passage of fluid results in the setting up of Bernoulli flow forces that tend to return the valve member 316 to a closed or neutral position. The pressure fluid passes to the controlled device, not shown, through passage 347 and fluid connector 349 which results in exhaust fluid flow through fluid connector 348, passage 346, and port 342c. As the valve spool portion has been moved to the right, the port 342c and passages 338 and 339 are placed in communication, thereby forcing fluid into the exhaust chamber 328 and causing an impingement of fluid on the face 350 of the valve land 334 setting up a force that balances or counteracts the Bernoulli flow forces that were set up by opening the valve, thus opposing the tendency the valve has to close. If the valve were moved in the opposite direction initially, the balancing forces would be set up on face 351 of valve land 337. The size and number of the passages leading to the exhaust chambers are of course dependent on the particular valve design.

The graph of Figure 6 contains three sets of curves corresponding to the actual "force" required to actuate identical valves having three different types of porting arrangements through a certain "displacement." The curves are those for a two-spool, close-centered valve actuated in either direction, hence the symmetry of the curve.

The curves OA and OB indicate the operation of valves using a conventional square edged porting system. As can be seen, the force required to actuate the valve increases almost linearly with displacement.

A considerable reduction in the actuation force was realized when a series of relatively small diameter holes was substituted for the conventional square edged ports. This relationship is shown in the graph by curves OC and OD.

However, when a series of relatively small holes abetted by an angularly disposed hole was used for the porting arrangement, such as is described in this specification relative to Figure 1, the forces that were required to be overcome, were those shown by curves OE and OF. The major portion of the force exerted, as indicated by OE and OF, was that necessary to overcome friction, as the Bernoulli flow forces had been all but totally balanced or compensated for by the stream of fluid exerted against the valve spool from the hole placed at an angle therewith.

It is obvious that modifications of the present invention other than those described may be made. Therefore, the scope of the invention should be determined from the following claims.

I claim:

1. In a valve for controlling a fluid actuator, the combination comprising a valve body and a valve spool disposed therein, said spool having a plurality of lands which are concentric with said valve body, said valve body having an inlet passage straddled by exhaust passages and two groups of holes serving as ports to said actuator which are covered by said lands when said valve is in a closed position, the outer hole of each group being disposed at an angle to certain ones of the face portions of said valve spool lands and the remaining holes extending radially from and perpendicularly toward the axis of said valve.

2. In a valve control, a valve body, a valve member disposed in said valve body and having a plurality of lands thereon, said valve body containing inlet and exhaust chambers and supply ports, passages adjacent to said supply ports leading to said exhaust chamber located at an acute angle with respect to the axis of said valve member, said passages being placed in communication with said supply port when said valve member is in an open position thereby causing fluid to strike a face of a valve land and thus assist said valve member to remain in said open position.

3. In a valve porting arrangement, a first valve member having a plurality of lands disposed in a bore of a second valve member, said second valve member containing an inlet port and an exhaust port and a supply port, at least one of said inlet port and said supply port extending at an acute angle with the axis of said first valve member so as to cause a fluid stream to strike a land face of said first valve member when in an open position thereby helping to maintain said open position.

4. In a valve porting arrangement, a valve member, another valve member having a land thereon, a hole in said first mentioned valve member to port fluid and so located as to cause impingement of fluid on a face of said land which is substantially perpendicular to the axis of said other valve member thus tending to cause movement of one of said valve members in an opening direction once an initial opening movement has been given one of said valve members.

5. A valve comprising a body, a cylinder within said body, a port in said body opening into said cylinder, said port comprising a plurality of relatively small passages most of which extend at right angles to the axis of said cylinder and are arranged longitudinally of said axis, a valve member axially movable in said cylinder and having a land thereon arranged to sequentially control said passages, said port also including an additional passage controlled by said valve member and land, said additional passage being arranged to cause fluid to impinge against a face of said land in a direction to tend to move said valve member in the same direction as the valve member movement that caused flow through the port initially.

6. In a valve for controlling a fluid actuator, the combination comprising a valve body and a valve sleeve disposed therein, a valve spool having a plurality of lands which are concentric with the valve sleeve, an inlet port, exhaust ports and actuator ports in said valve body and sleeve, said actuator ports being comprised of a series of bores in said valve sleeve which are radial and at least one additional bore associated with each of the actuator ports which is disposed at an angle to the face of the valve land, whereby movement of the valve spool from the neutral position will cause flow through the angular bore to impinge on the land face and aid valve movement.

7. In a valve for controlling a fluid actuator, the combination comprising a valve body including a bore, a valve member having a land which is concentric with the bore in said valve body, a port in said valve body comprised of a series of passages therein which are radial and at least one additional passage which is disposed at an angle to the face of the valve land, whereby movement of the valve member from the neutral position causes flow through the angular passage to impinge on the land face and aid valve movement.

8. A valve as in claim 7 wherein the valve land recited has oppositely directed faces and wherein the port recited therein comprises a series of radial passages and in which at least one passage at each end of the series is disposed at an angle to the nearest face of said valve land, the valve land when in neutral position covering all of said passages and when moved from said neutral position uncovering one or the other of said angularly disposed passages to permit flow therethrough to impinge against its respective face and thus assist the movement which caused the opening of said angularly disposed passage.

9. A valve as in claim 4 wherein the hole in said first member is a conical passage generated about the axis of the other valve member and divergent toward the nearest end of the first valve member, said conical passage being closed by said land of said other valve member when said land is in neutral position and wherein, when said conical passage is opened, the flow permitted therethrough will impinge on a face of said land in a manner tending to cause a further opening movement of said other valve member and said land.

10. A valve as in claim 5 wherein the additional passage is arranged to direct fluid normal to the face of the valve land to thereby tend to move the valve land in the same direction as caused flow through said additional passage initially.

11. A valve as in claim 4 wherein the hole in said first mentioned valve member is at an acute angle to a face of said valve land so that fluid impingement on said face will be at an acute angle and will tend to cause movement of said valve land in a further opening direction.

12. A valve as in claim 4 wherein said other valve member has oppositely directed land faces and wherein separate holes each adjacent a face are each arranged at an acute angle to its respective face so that motion of said other valve member in a direction permitting flow through either of said holes will permit fluid impingement against the adjacent face in a manner tending to cause additional motion of said other valve member in the same direction as the initial motion thereof.

References Cited in the file of this patent

UNITED STATES PATENTS

| | | |
|---|---|---|
| 2,396,643 | De Ganahl | Mar. 19, 1946 |
| 2,566,051 | Avery | Aug. 28, 1951 |
| 2,621,676 | Loft | Dec. 16, 1952 |
| 2,709,421 | Avery | May 31, 1955 |
| 2,712,422 | Gerwig | July 5, 1955 |
| 2,743,897 | Elliott et al. | May 1, 1956 |
| 2,747,612 | Lee | May 29, 1956 |
| 2,751,752 | Metcalf | June 26, 1956 |
| 2,817,359 | Hayner | Dec. 24, 1957 |
| 2,843,351 | Greist | July 15, 1958 |

FOREIGN PATENTS

| | | |
|---|---|---|
| 589,937 | Germany | 1932 |